United States Patent
Mochizuki et al.

[11] Patent Number: 5,881,380
[45] Date of Patent: Mar. 9, 1999

[54] DEVICE AND METHOD FOR DATA MANAGEMENT BASED ON VALUES

[75] Inventors: Shinichi Mochizuki; Tadamitsu Ryu; Ihoko Kurokawa, all of Kawasaki, Japan

[73] Assignee: Fujitsu Limited, Kawasaki, Japan

[21] Appl. No.: 632,362

[22] Filed: Apr. 11, 1996

[30] Foreign Application Priority Data

Sep. 12, 1995 [JP] Japan ................................ 7-234380

[51] Int. Cl.$^6$ .................................................. G06F 17/30
[52] U.S. Cl. ........................... 707/102; 707/101; 707/103
[58] Field of Search ................................ 395/683, 701, 395/601, 685, 613, 62, 500; 707/100, 103, 205, 5, 102, 504, 2, 509, 702, 101; 711/136; 364/497; 705/30, 36

[56] References Cited

U.S. PATENT DOCUMENTS

| | | | |
|---|---|---|---|
| 4,989,141 | 1/1991 | Lyons et al. | 705/30 |
| 5,062,074 | 10/1991 | Kleinberger | 707/5 |
| 5,119,465 | 6/1992 | Jack et al. | 395/500 |
| 5,175,810 | 12/1992 | Young et al. | 707/509 |
| 5,189,608 | 2/1993 | Lyons et al. | 705/36 |
| 5,280,575 | 1/1994 | Young et al. | 707/504 |
| 5,359,724 | 10/1994 | Earle | 707/205 |
| 5,434,971 | 7/1995 | Lysakoski, Jr. | 364/497 |
| 5,452,440 | 9/1995 | Salsburg | 711/136 |
| 5,471,596 | 11/1995 | Brown, III | 707/103 |
| 5,479,614 | 12/1995 | Aoe et al. | 707/103 |
| 5,481,692 | 1/1996 | Ryu et al. | 395/685 |
| 5,481,718 | 1/1996 | Ryu et al. | 395/683 |
| 5,504,886 | 4/1996 | Chang et al. | 707/2 |
| 5,513,348 | 4/1996 | Ryu et al. | 395/601 |
| 5,548,751 | 8/1996 | Ryu et al. | 395/613 |
| 5,557,787 | 9/1996 | Shin et al | 707/102 |
| 5,560,012 | 9/1996 | Ryu et al. | 395/701 |
| 5,594,836 | 1/1997 | Ryu et al. | 395/62 |
| 5,634,048 | 5/1997 | Ryu et al. | 395/610 |
| 5,675,784 | 10/1997 | Maxwell et al. | 707/100 |
| 5,680,618 | 10/1997 | Freund | 707/7 |

OTHER PUBLICATIONS

Chawathe et al. "The TSMIS Project: Integration of Heterogeneous Information Souces", Oct. 1994.

"Planning and Execution of Micro CAAT", Computer Audit Update, Nov. 1993.

Ceri et al. "Supporting Interoperability Between New Database Languages", Compeuro /91 Advanced Computer Technology, Reliable Systems and Applications, pp. 273–281, May 1991.

*Primary Examiner*—Thomas G. Black
*Assistant Examiner*—Charles L. Rones
*Attorney, Agent, or Firm*—Staas & Halsey

[57] ABSTRACT

A method of data management includes the steps of receiving a plurality of values, obtaining descriptions, each of the descriptions describing a corresponding one of the values, linking each of the values with a corresponding one of the descriptions, generating pointers, each of the pointers pointing to a corresponding one of the values, organizing the pointers in an arrangement representing a set having the values as elements, obtaining a description of the set, and linking the arrangement with the description of the set, wherein a data structure relating the values with each other is determined by the arrangement through accumulation of the values.

33 Claims, 14 Drawing Sheets

F I G. 1 A
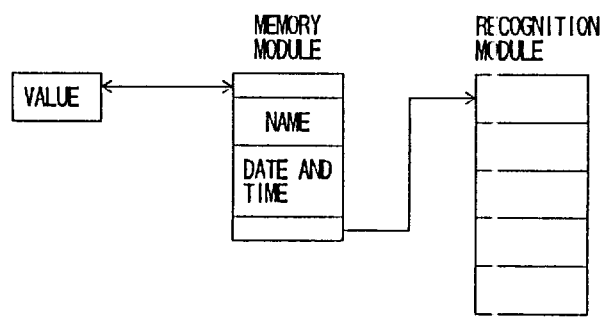
F I G. 1 B
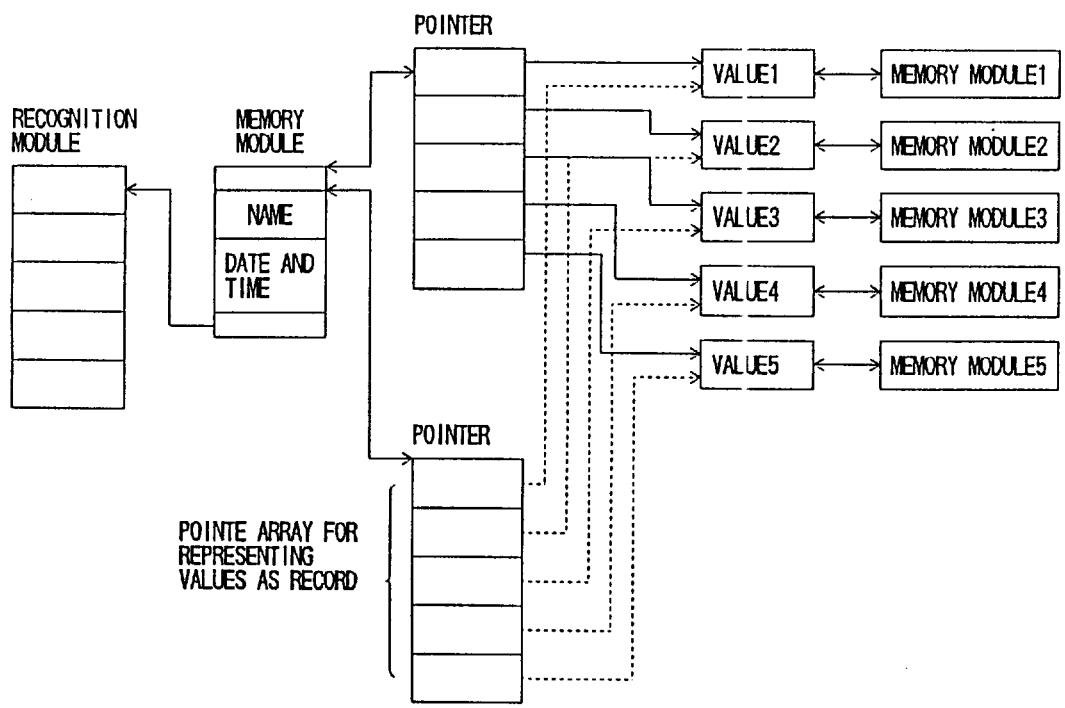

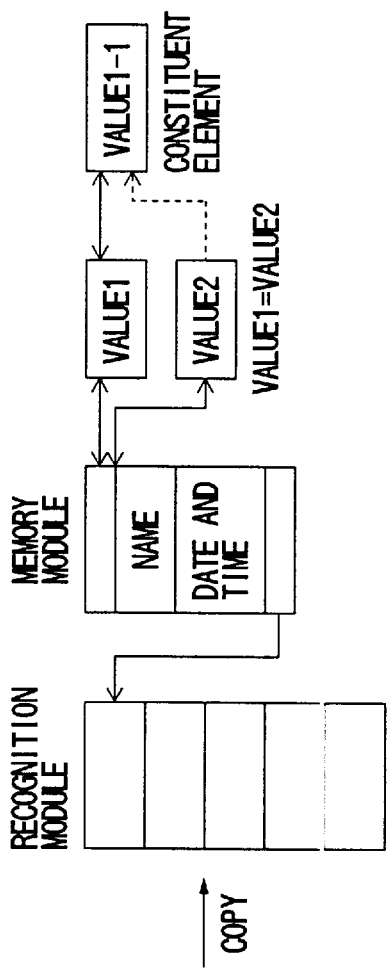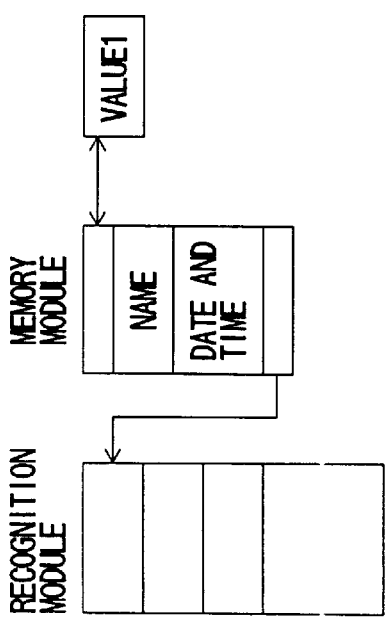

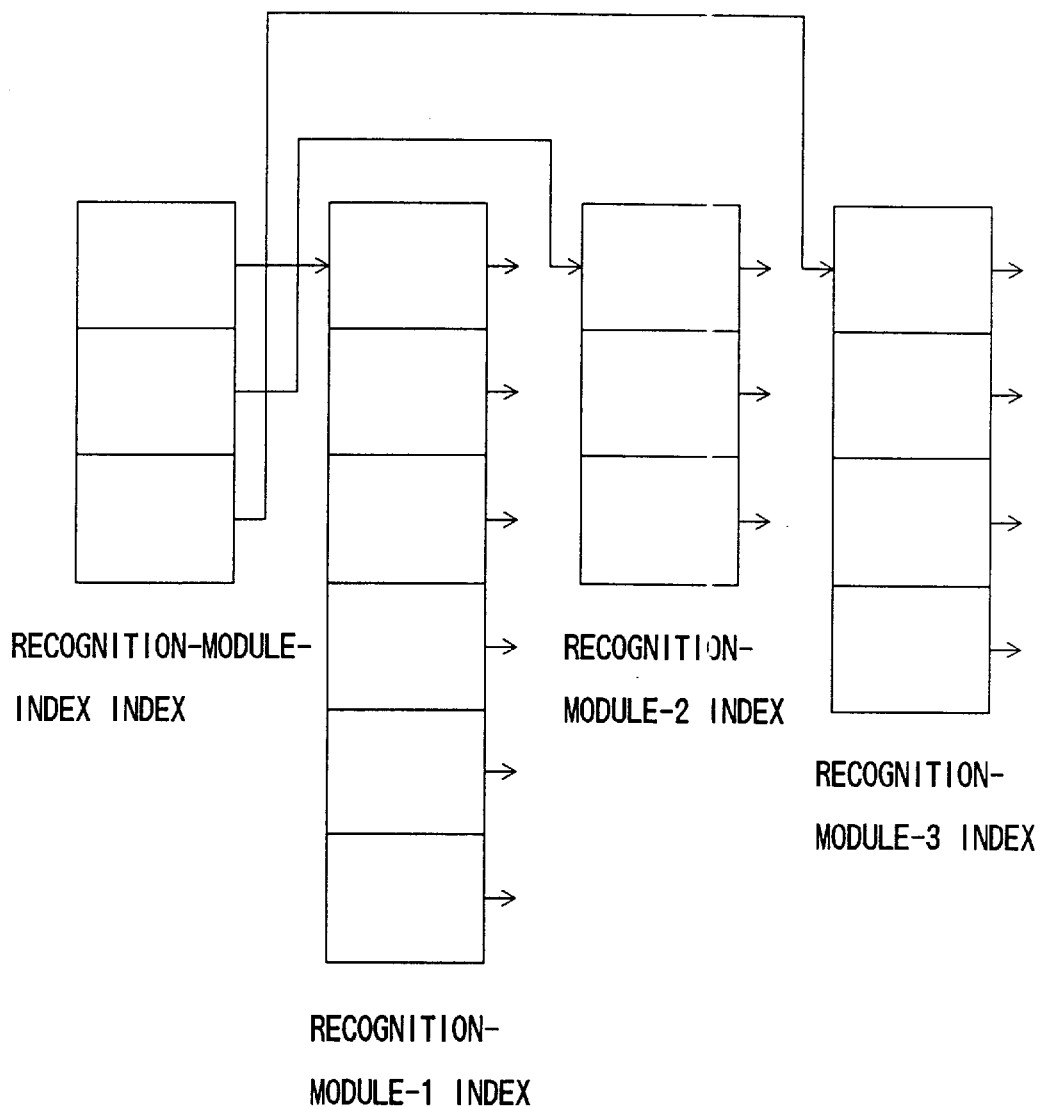

DEVICE AND METHOD FOR DATA MANAGEMENT BASED ON VALUES

BACKGROUND OF THE INVENTION

1. Field of the Invention

The present invention generally relates to data-management devices and data-management methods such as databases, and particularly relates to a data-management device and a data-management method which determine a data structure while storing data.

2. Description of the Related Art

Data-management methods used in databases and the like include a relation-type data-management method expressing relations between objects by using tables and a network-type data-management method linking each object by representing relations between objects by using links. These two methods are those most commonly used in the field. In data-management devices using these data-management methods, a schema (information about a data structure of stored data) should be decided first, and, then, values of data are stored based on the determined data structure. Namely, a schema must be decided by estimating usage of stored data prior to the development of databases.

In data-management devices utilizing an object-oriented scheme, objects can inherit attributes from more general objects. Based on this inheritance relation, data can be organized by grouping objects of upper-level concepts and objects of lower-level concepts together. Thus, data management can be efficiently carried out. Even in such data-management devices employing the object-oriented scheme, values of each data can be stored only after a data structure of objects representing concepts is determined.

In these data-management devices, there is a problem in that it is difficult to modify the data structure once it is determined. For example, when usage of a database is changed in response to changes in an environment in which the database is used, it is desirable to continue to use the existing data structure for a new demand. But the existing data structure without modification cannot be applicable in the new environment. Namely, the data-management device cannot satisfy a need of users when the users want an expansion of the database beyond an existing framework. In order to expand and modify the database beyond the existing framework, modification of the data structure, reentry of all values, development of application programs, etc., must be accomplished, taking a long time.

Furthermore, in the data-management devices based on the object-oriented scheme, there is a case in which a gap develops between concepts represented by objects and values to be stored, as the values of data are accumulated in the databases. Namely, as the values are accumulated after deciding on a data structure representing concepts from upper levels to lower levels, a new data structure may become necessary to represent new concepts, or concepts based on the existing data structure may be required to be modified. In this case, the data-management devices of the related art need reentry of all the data after newly developing a data structure representing the upper-level concepts.

Accordingly, there is a need in the field of data-management devices and data-management methods for a data-management device and a data-management method which can determine a data structure during the accumulation of values when a determination of the data structure is difficult prior to the collection of actual values or when the usage of the values frequently varies, and, further, which can change the data structure according to the usage of the values.

Also, there is a need for a data-management device and a data-management method which can use values without any change for applications developed in consistency with the original data structure even when the data structure is changed, and, further, which can cope with the newly added data structure by allowing development of additional applications.

Also, there is a need for a data-management device and a data-management method which can create an appropriate data structure matching with the usage of values by uncovering relations between the values during the accumulation of the values.

SUMMARY OF THE INVENTION

Accordingly, it is a general object of the present invention to provide a data-management device and a data-management method which can satisfy the needs described above.

Also, it is another and more specific object of the present invention to provide a data-management device and a data-management method which can determine a data structure during the accumulation of values when a determination of the data structure is difficult prior to the collection of actual values or when the usage of the values frequently varies, and, further, which can change the data structure according to the usage of the values.

In order to achieve the above objects according to the present invention, a method of data management includes the steps of receiving a plurality of values, obtaining descriptions, each of the descriptions describing a corresponding one of the values, linking each of the values with a corresponding one of the descriptions, generating pointers, each of the pointers pointing to a corresponding one of the values, organizing the pointers in an arrangement representing a set having the values as elements, obtaining a description of the set, and linking the arrangement with the description of the set, wherein a data structure relating the values with each other is determined by the arrangement through accumulation of the values.

The above objects are also achieved by a device according to the present invention. The device for data management includes an inputting unit for receiving values and first descriptions, each of the first descriptions describing a corresponding one of the values, a collecting unit for putting some of the values together to create a set, the collecting unit comprising a first unit for generating pointers, each of the pointers pointing to a corresponding one of the some of the values, and a second unit for organizing the pointers in an arrangement representing the set having the some of the values as elements, wherein a plurality of sets equivalent to the set are created and the sets are treated as the values, an analyzing unit for generating second descriptions, each of the second descriptions describing a corresponding one of the values, a link unit for linking each of the values with a corresponding one of the first descriptions and a corresponding one of the second descriptions, and a storing unit for storing the values including the sets, the first descriptions, and the second descriptions, wherein a data structure relating the values with each other is determined by the arrangement through accumulation of the values.

In the method and the device described above, the set values are formed by putting the values together, so that the data structure can be determined through accumulation of the values. Therefore, there is no need to determine a schema in advance. Also, an appropriate data structure can be generated in accordance with usage of the values through the accumulation of the values.

Also, it is still another object of the present invention to provide a data-management device and a data-management method which can use values without any change for applications developed in consistency with the original data structure even when the data structure is changed, and, further, which can cope with the newly added data structure by allowing development of additional applications.

In the method and the device described above, the set values have a structure in which the values are linked through the pointers. This data structure does not need definitions of data sizes and data types as needed in an array or a structure. Therefore, even when the data structure is changed within a purview of the present invention, application programs are free from a failure to read the values because of data-size mismatches and data-type mismatches. Also, this makes it easier to develop application programs after a change in the data structure or an addition of a new data structure.

Also, it is yet another object of the present invention to provide a data-management device and a data-management method which can create an appropriate data structure matching with the usage of values by uncovering relations between the values during the accumulation of the values.

In the method and the device described above, the data structure is determined by using the values actually accumulated in the database rather than by projecting the usage of the values in advance. Thus, the data structure thus created is an appropriate reflection of the usage of the values actually stored in the database.

Other objects and further features of the present invention will be apparent from the following detailed description when read in conjunction with the accompanying drawings.

BRIEF DESCRIPTION OF THE DRAWINGS

FIGS. 1A and 1B are illustrative drawings showing a principle of the present invention;

FIGS. 6A and 6B are illustrative drawings for explaining a value copying function;

FIG. 9 is an illustrative drawing showing a structure of indexes used when a search is conducted by using a recognition module as a search condition according to the embodiment of the present invention;

DESCRIPTION OF THE PREFERRED EMBODIMENTS

Figures 2A, 2B:
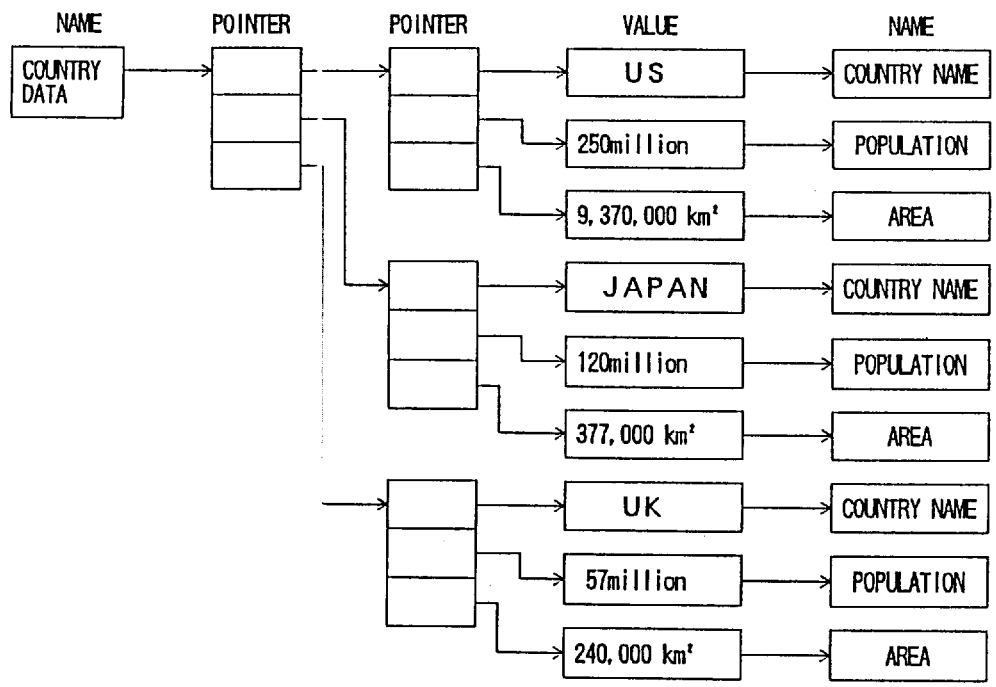
FIGS. 2A and 2B are illustrative drawings showing relations between attribute values, records, and a table.

In the following, a principle and an embodiment of the present invention will be described with reference to the accompanying drawings.

FIGS. 1A and 1B are illustrative drawings showing a principle of the present invention. As shown in FIG. 1A, when a value is stored in a data-management device (not shown in FIG. 1A, but shown in and discussed with reference to FIG. 3), a description is attached to the value. The description attached to the value is comprised of a memory module and a recognition module. When a value is stored, the memory module is always attached thereto, but the recognition module may or may not be attached thereto.

The memory module includes two elements. One is a name of the value given by a user, and the other is a date and a time automatically given by the data-management device. The date and time record the date and time when the value is stored. The recognition module is an arbitrary description of the stored value other than the name and the date and time. For example, the recognition module may include management information useful for data management such as an owner's name, and may include attribute information for representing features of the stored value.

There is no essential difference between the memory module and the recognition module, both of which are information for describing the value. The purpose of the classification of the memory module and the recognition module is to distinguish mandatory information from non-essential information. As described above, the mandatory information is the name and the date and time which are stored as the memory module, and the non-essential information is stored as the recognition module. Here, the mandatory information does not always have to be the name and the date and time, but other information may be used as the mandatory information. Also, information about a type of a value is implicitly attached to the value itself, and, therefore, need not be included in the memory module or the recognition module.

The value, the memory module, and the recognition module may be related with each other by a pointer indicating each of them, for example. A method of storing the value and these modules in relation with each other is not limited to any particular type of a data structure.

For each element of the memory module or the recognition module, a comparison can be made between different values. A method of the comparison can be determined for each element. For example, it is possible to compare the date and time of the memory module between different values so as to sort the values chronologically.

As shown in FIG. 1B, a plurality of values can be collected together to treat them as one value. Hereinafter, a value serving as the smallest unit is called a single value, and a value comprised of a set of single values is called a set value.

In the example of FIG. 1B, five single values 1 through 5 are collected together to form a set value. In FIG. 1B, a structure of the set value is represented by an arrangement of the memory modules attached to the single values. Namely, although a single value has a memory module and a recognition module, only the memory modules of the single values are shown in FIG. 1B. A similar illustration will be used throughout this description to represent a structure of a set value in the data-management device of the present invention. Namely, an arrangement of memory modules or an arrangement of names will be typically used to represent the structure of a set value.

In order to form a set value by putting together single values, a set of pointers (an array of pointers) is used as shown in FIG. 1B. Each of the pointers corresponds to one of the values 1 through 5, and a set of the pointers is regarded as one set value. In order to make a comparison of a structure between different set values easier, the pointers are sorted in a particular order. As shown in FIG. 1B, one set value may have a plurality of sets of pointers arranged in different orders. For example, one arrangement is made by sorting the pointers based on certain information contained in the recognition modules, and another arrangement is made by sorting the pointers based on the dates contained in the memory modules to represent an order in which the values are stored. Also, it should be apparent that constituent elements of a set value may be other set values instead of single values.

When single values constituting a set value are regarded as attribute values of a record, the set value can be regarded as one record. Also, since constituent elements of a set value can be other set values instead of single values, the set value can be regarded as a table if the constituent elements of the set values are regarded as records of a database. FIGS. 2A and 2B are illustrative drawings showing relations between attribute values, records, and a table.

FIG. 2A shows a table listing country data. In this table, a set value can be formed by using each data of the United States as a single value, for example. A name of this set value is "US", and this set value includes a country name, population data, and area data of the United States as constituent elements. Namely, this set value can be regarded as a record named "US". Further, set values for Japan and the United Kingdom are created in the same manner as for the United States. In this case, a set value having the set values "US", "JAPAN", and "UK" as constituent elements can be regarded as a table having a name "COUNTRY DATA".

FIG. 2B shows a data structure of the set value corresponding to the table. As shown in FIG. 2B, the set value having the name "COUNTRY DATA" is comprised of the set values "US", "JAPAN", and "UK". In this manner, a set value according to the principle of the present invention has double aspects corresponding to the two concepts, i.e., the record and the table of the relational database. In FIG. 2B, only names of the memory modules are shown, and the date and time of the memory modules and the recognition modules are omitted.

According to the principle of the present invention, the values are stored with the descriptions thereof attached thereto, so that the values can be used as a database. Also, since the set values are formed by putting the values together, a structure of the values, i.e., a data structure, can be determined through accumulation of the values. Therefore, there is no need to determine a schema in advance. Also, an appropriate data structure can be generated in accordance with usage of the values through the accumulation of the values.

Further, the set values have a structure in which the values are linked through the pointers. This data structure does not need definitions of data sizes and data types as needed in an array or a structure. Therefore, even when the data structure is changed within a purview of the present invention, application programs are free from a failure to read the values because of data-size mismatches and data-type mismatches.

In the following, an embodiment of the present invention will be described with reference to the accompanying drawings.

Figure 3:
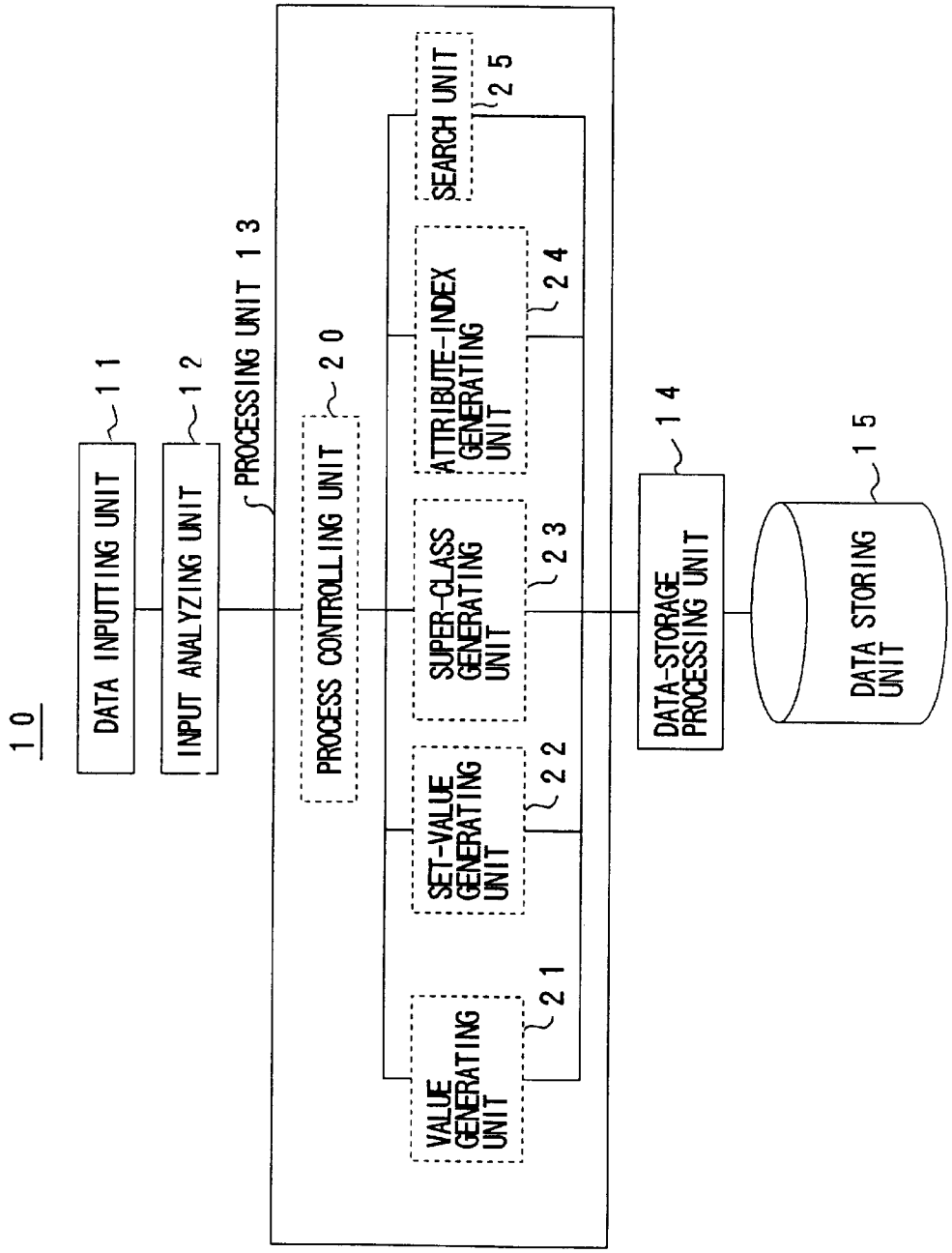
FIG. 3 is a block diagram of a data-management device according to an embodiment of the present invention.

FIG. 3 is a block diagram of a data-management device according to the embodiment of the present invention. In FIG. 3, a data-management device 10 includes a data inputting unit 11, an input analyzing unit 12, a processing unit 13, a data-storage processing unit 14, and a data storing unit 15.

The data inputting unit 11 includes at least one input device such as a keyboard, and receives data inputs and command inputs from a user to supply them to the input analyzing unit 12. The input analyzing unit 12 includes a CPU (central processing unit) and a memory, and generates a procedure to be processed by the processing unit 13 based on the inputs from the user. Also, the input analyzing unit 12 generates some elements of the memory module and the recognition module which can be automatically generated (e.g., the date and time). The processing unit 13 includes a CPU and a memory, and carries out a required process based on the procedure generated by the input analyzing unit 12. When the processing unit 13 operates, the data inputs from the user are supplied to the processing unit 13 via the input analyzing unit 12, and are subjected to various processes such as storing, adding, and modifying of values. Values, memory modules, and recognition modules generated by the processing unit 13 in the memory are stored by the data-storage processing unit 14 in the data storing unit 15, which is long-term data storage means. Also, the data-storage processing unit 14 reads these pieces of data from the data storing unit 15. The data storing unit 15 is an external memory such as a hard drive, and stores the values, the memory modules, and the recognition modules.

The processing unit 13 includes a process controlling unit 20, a value generating unit 21, a set-value generating unit 22, a super-class generating unit 23, an attribute-index generating unit 24, and a search unit 25. The process controlling unit 20 controls other elements of the processing unit 13, and is responsible for data exchanges between these elements and the input analyzing unit 12.

The value generating unit 21 acquires memory areas in the memory for a single value or a set value, a memory module, and a recognition module, and, then, sets data in these memory areas. Also, the value generating unit 21 releases these memory areas in the memory to delete the values. The set-value generating unit 22 generates a set value by selecting values (single values or set values) and putting them together, based on contents of the memory modules and the recognition modules and structures of the recognition modules. Here, the structure of the recognition module is defined by the number and types of elements in the recognition module. The super-class generating unit 23 extracts common elements of recognition modules from a plurality of values selected by the user, and forms a set of common recognition-module elements. Then, the super-class generating unit 23 generates a super class by attaching a memory module to the set of common recognition-module elements. The memory module of the generated super class is linked through pointers with the plurality of values selected by the user.

The attribute-index generating unit 24 generates indexes used when data is searched for in the set values serving as tables. In this case, a set value is regarded as a table, and constituent elements of the set value are regarded as records. Also, further constituent elements of the constituent elements are regarded as attributes of the tables. The indexes are attached to these attributes. The search unit 25 carries out the search, updating, and removal of the data by treating the set value as a table and constituent elements of the set value as records.

The description provided above is only an outline of an operation of each unit. A detailed description of an operation of each unit will be provided below.

Figure 4:
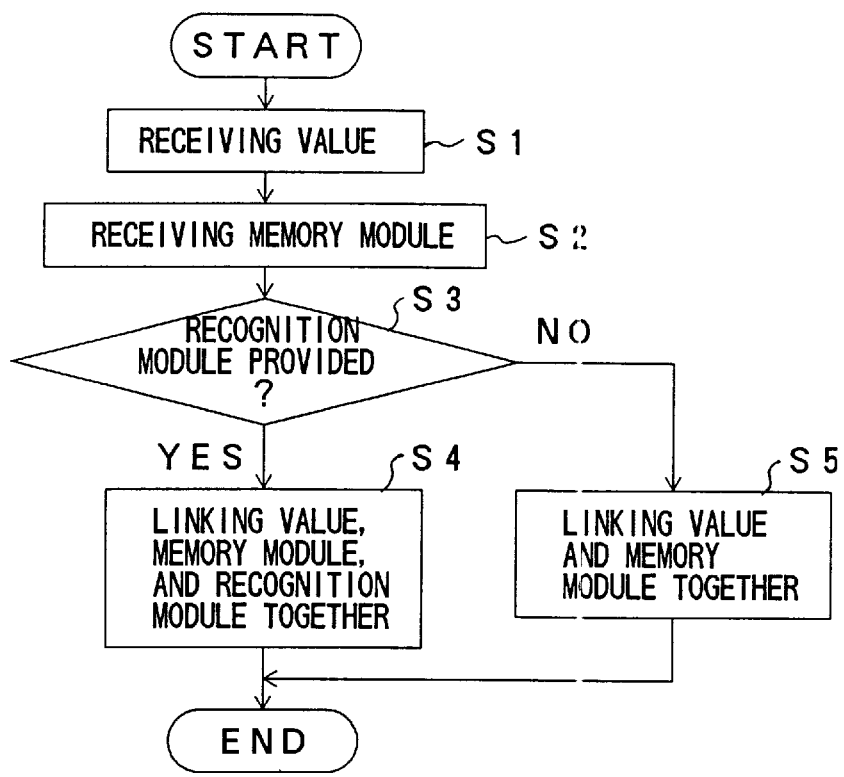
FIG. 4 is a flowchart of a process of storing values according to the embodiment of the present invention.

FIG. 4 is a flowchart of a process of storing values according to the embodiment of the present invention. The process of FIG. 4 is carried out by the value generating unit 21 of the processing unit 13 in FIG. 3, generating a data structure as shown in FIG. 1A.

At a step S1, the value generating unit 21 receives a value from the input analyzing unit 12.

At a step S2, the value generating unit 21 receives a memory module from the input analyzing unit 12.

At a step S3, the value generating unit 21 checks whether a recognition module is provided from the input analyzing unit 12. If it is, the procedure goes to a step S4. Otherwise, the procedure goes to a step S5.

At the step S4, the value, the memory module, and the recognition module are connected with each other through links. That is, each is linked by a pointer.

At the step S5, the value and the memory module are connected through a link. This ends the procedure.

Figure 5:
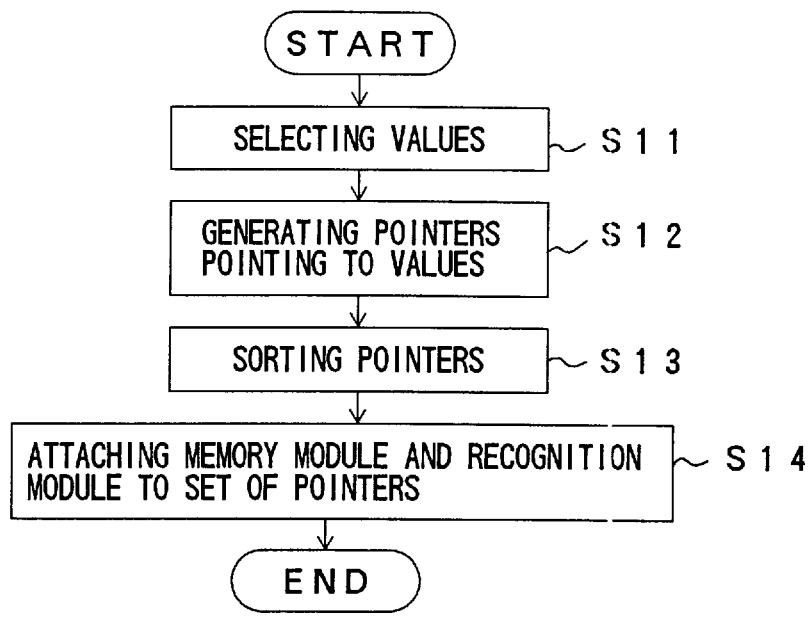
FIG. 5 is a flowchart of a process of generating a set value according to the embodiment of the present invention.

FIG. 5 is a flowchart of a process of generating a set value according to the embodiment of the present invention. The process of FIG. 5 is carried out by the set-value generating unit 22 of the processing unit 13 in FIG. 3, generating a data structure as shown in FIG. 1B.

At a step S11, values to be put together are selected. The selection of the values is made based on the contents of memory modules and recognition modules as well as the structures of the recognition modules defined by the number and types of the recognition-module elements. In the example of FIG. 2B, a single value corresponding to population data has a name "POPULATION" in the memory module thereof. Therefore, it is possible to select single values regarding population data by using the name "POPULATION" as a keyword. These single values may have attribute data "COUNTRY POPULATION DATA" in the recognition modules thereof. Therefore, it is possible to select these single values regarding population data by using the attribute data "COUNTRY POPULATION DATA" as a keyword. Also, conditions for selecting the values can be set based on the number and types of elements contained in a recognition module.

At a step S12, a set of pointers pointing to values is generated. By using this set of pointers, the values can be treated as one set.

At a step S13, the pointers are sorted based on an appropriate element of the memory module or the recognition module. The sorting of the pointers may be based on the date and time of the memory module, or may be based on an alphabetical order of the name. Conditions of the sorting may be preset as default, or may be determined each time a set value is generated. Also, a plurality of sets of pointers may be generated to represent different orders.

At a step S14, a set value is generated by attaching a memory module and a recognition module, if necessary, to a set of the values. This ends the process of generating a set value.

By using the value storing process or the set-value generating process described above, the data-management device 10 of FIG. 3 can store the value, the memory module, and the recognition module in a form as shown in FIG. 1A or 1B, respectively. In doing so, the value is stored with a description thereof attached thereto, so that the value can be used in a database. Also, since the data structure is determined through accumulation of the values, there is no need to determine a schema in advance. Further, an appropriate data structure can be generated in accordance with usage of the values through the accumulation of the values.

The data-management device 10 provides various functions of manipulating the values (single values and set values). These functions include copying, generating, inserting, deleting, destroying, adding to a value, removing from a value, etc. Each function will be briefly described below. Here, all the functions of manipulating values are provided for the manipulating of existing values, and there is no concept in the present invention of the manipulation of schema.

FIGS. 6A and 6B are illustrative drawings for explaining a value copying function. The value copying function may be used when a value having the same contents as an existing value is newly stored. As shown in the figure, a value copying process is carried out by newly generating the same value as an existing value through the replication of the existing value. The newly generated value is linked to the memory module of the existing value. When the existing value is a set value, a newly generated value will point to the constituent elements of the existing value.

Figure 7A:
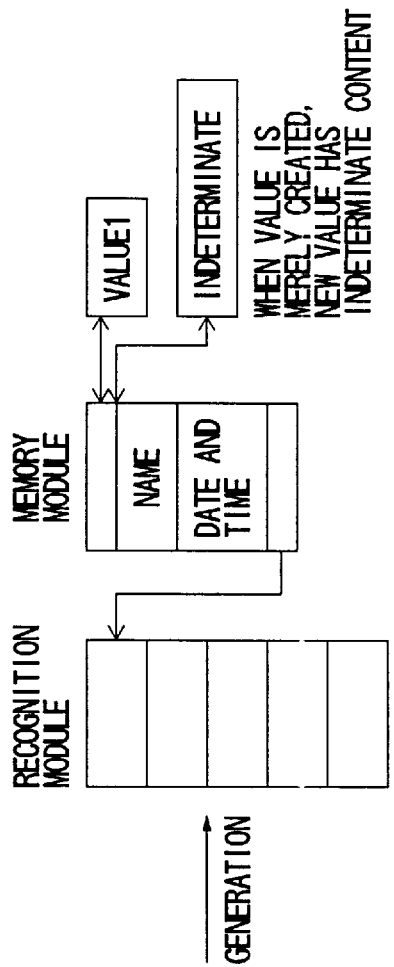
FIGS. 7A and 7B are illustrative drawings for explaining a value generating function.
Figure 7B:
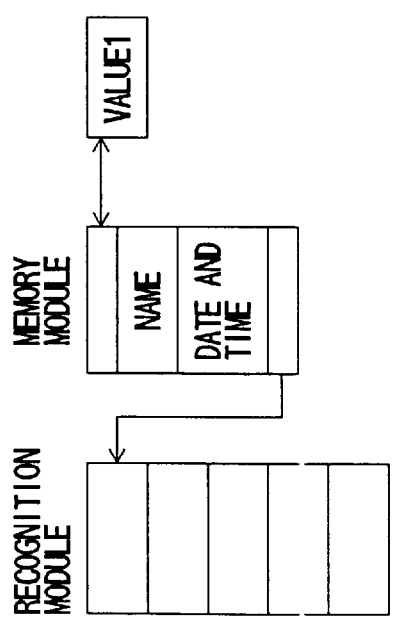

FIGS. 7A and 7B are illustrative drawings for explaining a value generating function. The value generating function may be used when a value having the same description as an existing value is newly stored. As shown in the figure, a value generating process generates a new value, and links it with the memory module of an existing value. When a specific value is given at the time of the generation, the new value will have the specific value. However, when no specific value is provided, the new value has an indeterminate content (the content of the new value is yet to be decided).

Figure 8A:
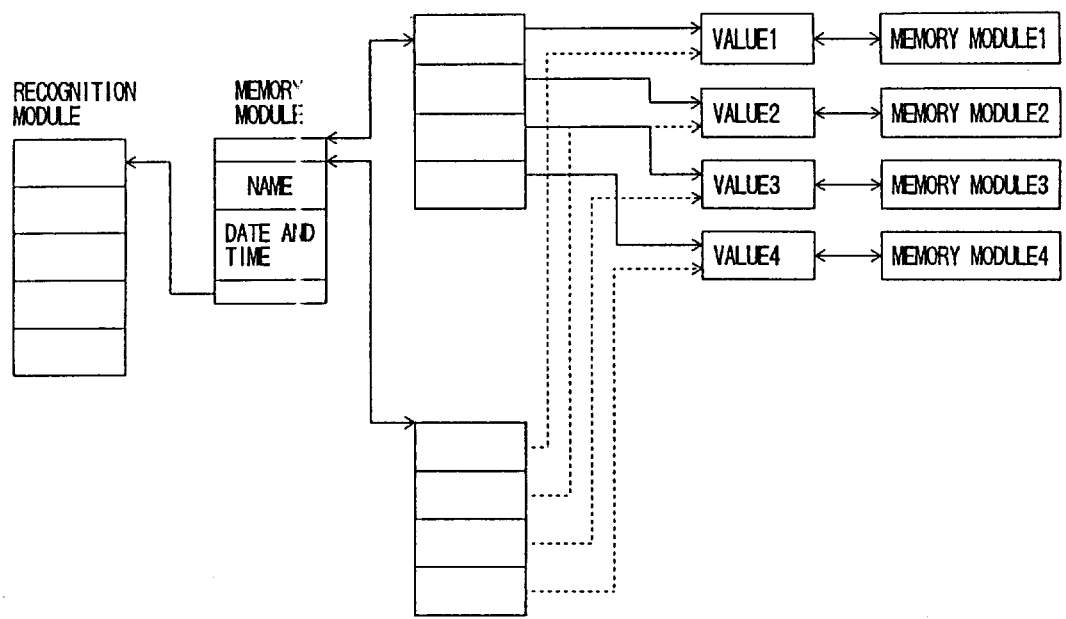
FIGS. 8A and 8B are illustrative drawings for explaining a value inserting function.
Figure 8B:
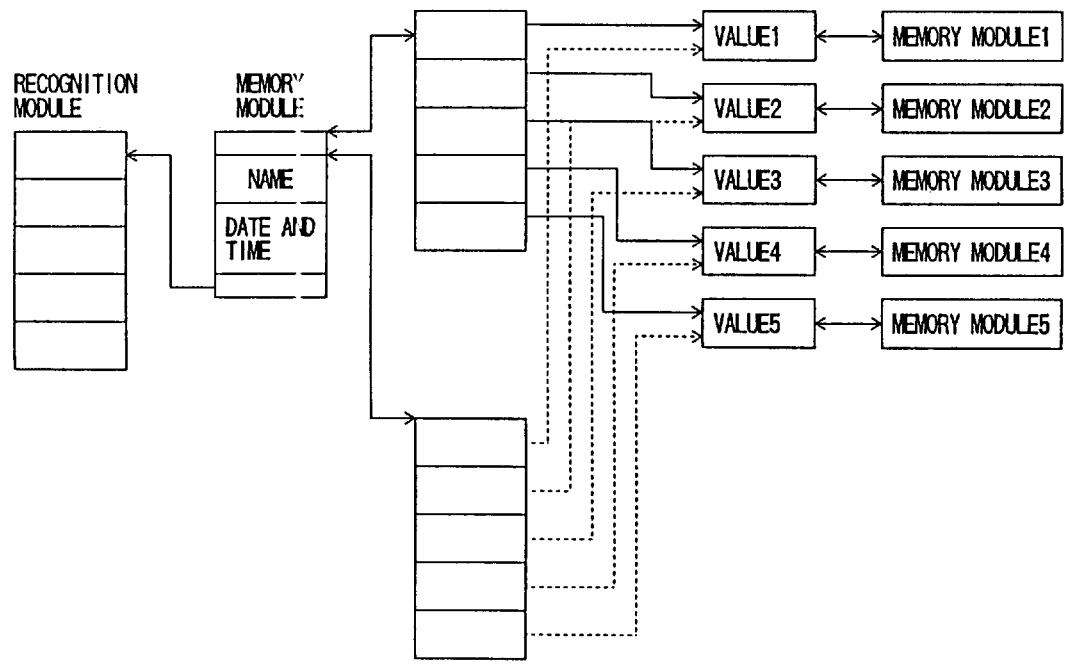

FIGS. 8A and 8B are illustrative drawings for explaining a value inserting function. The value inserting function may be used when a value is newly added to an existing value. When the existing value is a single value, it will become a set value after the insertion. As shown in the figure, values 1 through 4 constitute an existing set value. By adding a value 5 to the existing set value, a set value comprising the values 1 through 5 is created. At the time of addition, a new pointer is allocated to the value 5, and is added to an existing set of pointers.

A value deleting function removes a value having an indicated description from an existing value. This value deleting function is a reversed process of the value inserting function of FIGS. 8A and 8B. If the existing value is a single value, the value deleting function will delete only one remaining value. In this case, thus, the value deleting function means a deletion of the existence of the value.

A destroying function decreases the number of references made by set values. In the present invention, each value is made reference to by a plurality of set values, and the number of these references is recorded. If the number of references is zero, the destroying function deletes an existing value from the data storing unit 15. The destroying function deletes a value itself if it is a single value, and deletes a set of pointers if the value is a set value.

A value adding function adds values with the same description to all values included in a set value. In the example of FIGS. 2A and 2B, the value adding function may add another item to each country in addition to the items "COUNTRY NAME", "POPULATION", and "AREA", for example. That is, an item "GDP" may be added to store GDP (gross domestic product) data of each country. In FIG. 2A, a column "GDP" is added to the right-hand side of the table. In FIG. 2B, a single value having a name "GDP" and the same description for each country is added to a set value of each country as a new constituent element.

A value removing function removes values with the same description from all values included in a set value. This value removing function carries out a reverse process of the value adding function described above. The value removing function does not remove a value itself having an indicated description.

A recognition-module copying function duplicates a description of an existing value for another value. That is, the description is added to a description of another value. A recognition-module adding function adds a new description to a value. A recognition-module removing function removes the same description as an indicated description from a description of a value. A recognition-module modifying function modifies a specific description to an indicated description.

These various functions are prepared in the data-management device 10 according to the embodiment of the present invention. When developing a database by determining a data structure through the accumulation of values, use of these various functions allows an efficient work.

Also, according to the embodiment of the present invention, when a set value has a plurality of set values as constituent elements, a change in a structure of one of the constituent elements does not necessitate changes in the other constituent elements. In the example of FIGS. 2A and 2B, when an item "GDP" is added to the set value "US", a structure of only the set value "US" is changed in FIG. 2B with no need to change structures of the set values "UK" and "JAPAN". If data is simply stored in a table form of FIG. 2A as in the related art, an addition of the item "GDP" to US means additions of the item "GDP" to Japan and UK as well. That is, the data structures of all the records are changed.

In the present invention, a value can be searched for by using the recognition module as a search condition. For example, values having a name "COUNTRY NAME" may be searched for, or values created within the last two months may be searched for. Here, although the name and the date and time belong to the memory module, there is no essential difference between the memory module and the recognition module. Thus, hereinafter, the memory module is also called the recognition module unless there is a need for the distinction.

FIG. 9 is an illustrative drawing showing a structure of indexes used when a search is conducted by using the recognition module as a search condition according to the embodiment of the present invention. Since the recognition module is used as a search condition, indexes are prepared for each recognition module element. In FIG. 9, recognition-module-element-1 indexes, recognition-module-element-2 indexes, and recognition-module-element-3 indexes are provided. For example, for recognition-module elements such as the name, the date and time, and the owner, name indexes, date-and-time indexes, and owner indexes are prepared, respectively. For example, each index of the name indexes points to the name of a corresponding value. Each index of the owner indexes points to the owner of a corresponding value which has the owner as a recognition-module element.

As shown in FIG. 9, recognition-module-element-index indexes are prepared to index the recognition-module-element indexes. This is a mechanism to assure a rapid access to the recognition-module-element indexes since the number of the recognition-module-element indexes becomes numerous.

Figure 10:
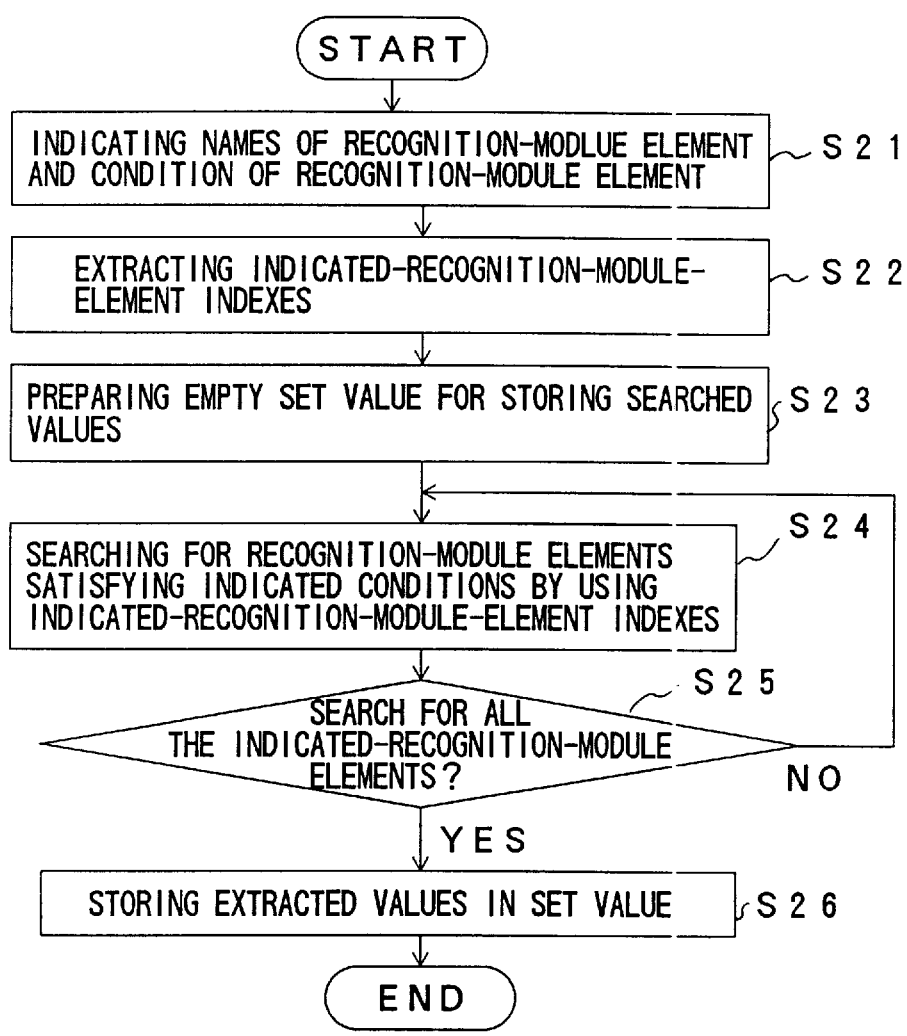
FIG. 10 is a flowchart of a process of searching for values by using the recognition module as a search condition.

FIG. 10 is a flowchart of a process of searching for values by using the recognition module as a search condition. In this flowchart, values are searched for based on the recognition module, and a set value is created by putting selected values together. This searching process is implemented by the set-value generating unit 22 of FIG. 3. That is, the flowchart of FIG. 10 corresponds to a search process automatically carrying out the selection of values at the step S11 of FIG. 5 by the set-value generating unit 22.

At a step S21, names of recognition-module elements and conditions of these recognition-module elements are indicated. For example, the name of one recognition-module element may be "date and time", and the condition may be "within the last three month".

At a step S22, the indicated names of the recognition-module elements are searched for in the recognition-module-element-index indexes, and the indicated-recognition-module-element indexes are extracted.

At a step S23, an empty set value is prepared to store selected values. By this, a set value putting the selected values together can be created. Here, a recognition module is attached to the empty set value.

At a step S24, recognition-module elements satisfying the indicated conditions are searched for by using the indicated-recognition-module-element indexes, and values satisfying the conditions are selected.

At a step S25, a check is made whether the search is conducted for all the indicated-recognition-module elements. If it is, the procedure goes to a step S26. Otherwise, the procedure goes back to the step S24.

At the step S26, the selected values are stored in the set value. This ends the procedure.

In this procedure, there are cases in which conditions of a plurality of recognition-module elements are connected with each other through the AND operation, the OR operation, or the AND and OR operations. Thus, at the step S24, appropriate values are extracted depending on which one of these cases should be applied.

In the data-management device 10 according to the embodiment of the present invention, the set-value generating unit 22 carries out the search process as described above, so that values are searched for based on search conditions of the recognition-module elements. Since the recognition-module-element indexes and the recognition-module-element-index indexes are used in the search, the values are searched for at high speed.

The embodiment of the present invention is provided with another search method which extracts set values or single values (constituent elements) of the set values based on conditions of values. For example, countries (set values) with a population less than two million may be extracted, or areas (single values) of the countries with a population less than two million may be extracted. In the search based on conditions of values, indexes are prepared to speed up the search.

Figure 11:
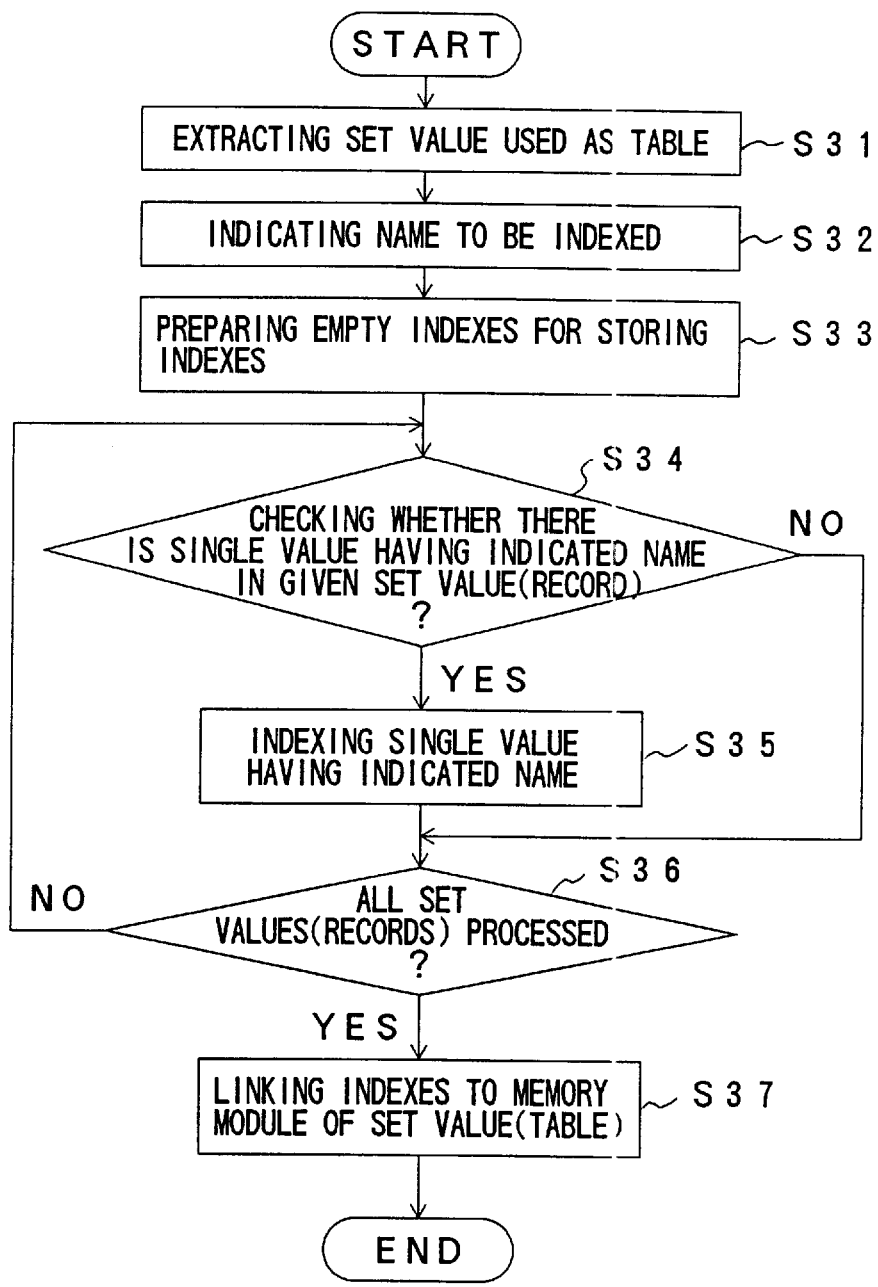
FIG. 11 is a flowchart of a process of giving indexes to single values for a set value (table) having set values as constituent elements with these set values having these single values as constituent elements.

FIG. 11 is a flowchart of a process of giving indexes to single values for a set value (table) having set values as constituent elements with these set values having these single values as constituent elements. This corresponds to the indexing of attribute values of each record in the table. The process of giving indexes is carried out by attribute-index generating unit 24 of FIG. 3.

At a step S31, a set value used as a table is extracted.

At a step S32, a name to be indexed is indicated. For example, when the population data in the table of FIG. 2A is to be indexed, the name "POPULATION" is indicated.

At a step S33, empty indexes for storing indexes are prepared.

At a step S34, a check is made whether there is a single value having the indicated name in a given set value (i.e., a given record). If there is, the procedure goes to a step S35. Otherwise, the procedure skips the step S35.

At the step S35, the single value having the indicated name is indexed, and this index is stored in one of the empty indexes.

At a step S36, a check is made whether the processes of the steps S34 and S35 are carried out for all the set values (records) provided as constituent elements. If they are, the procedure goes back to the step S34. Otherwise, the procedure goes to a step S37.

At the step S37, generated indexes (an index table) are linked to the memory module of the set value (table). By doing so, the generated index table can be used for searching attribute values in the table.

Figure 12:
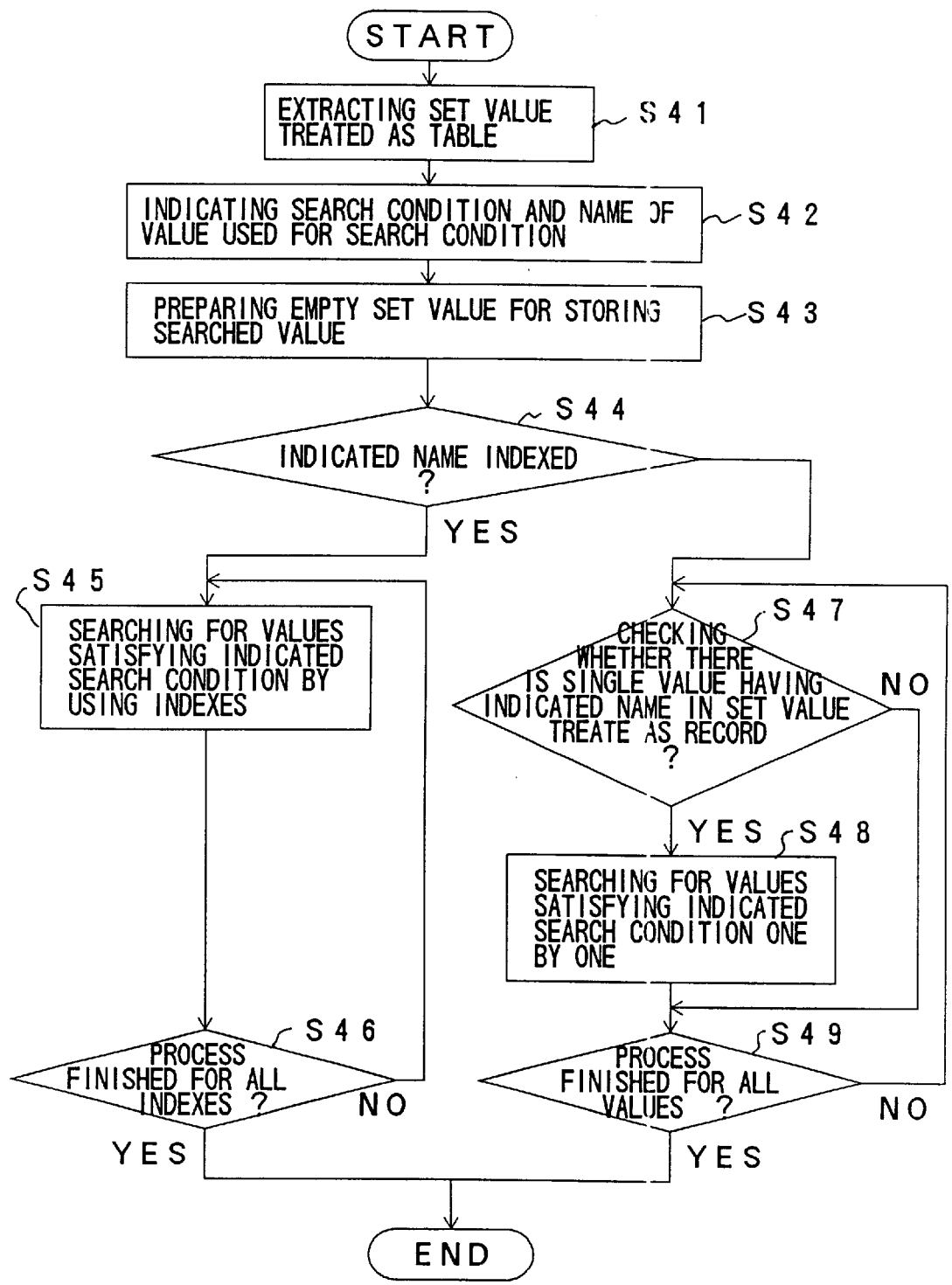
FIG. 12 is a flowchart of a process of searching for values by using values as a search condition.

FIG. 12 is a flowchart of a process of searching for values by using values as a search condition. This process of searching for values is carried out by the search unit 25 of FIG. 3.

At a step S41, a set value treated as a table is extracted.

At a step S42, a search condition and a name of a value used for the search condition are indicated.

At a step S43, an empty set value for storing selected values is prepared.

At a step S44, a check is made whether the indicated name is indexed. If it is, the procedure goes to a step S45. Otherwise, the procedure goes to a step S47.

At the step S45, values satisfying the indicated search condition are searched for by using indexes, and the selected values are stored in the empty set value.

At a step S46, a check is made whether the process of the step S45 is carried out for all the indexes satisfying the condition. If there is still an index satisfying the condition, the procedure goes back to the step S45. Otherwise, the procedure ends.

At the step S47, a check is made whether there is a single value having the indicated name in a set value treated as a record. If there is, the procedure goes to a step S48. Otherwise, the procedure skips the step S48.

At the step S48, values satisfying the indicated search condition are searched for one by one, and the selected values are stored in the empty set value.

At a step S49, a check is made whether the process of the step S48 is carried out for all the values. If it is not, the procedure goes back to the step S47. Otherwise, the procedure ends.

In the data-management device 10 according to the embodiment of the present invention, the search unit 25 carries out the search process described above, so that values are searched for based on a search condition using an indicated value. Since the attribute-index generating unit 24 can index the values in advance, the search can be conducted at high speed.

Figure 13:
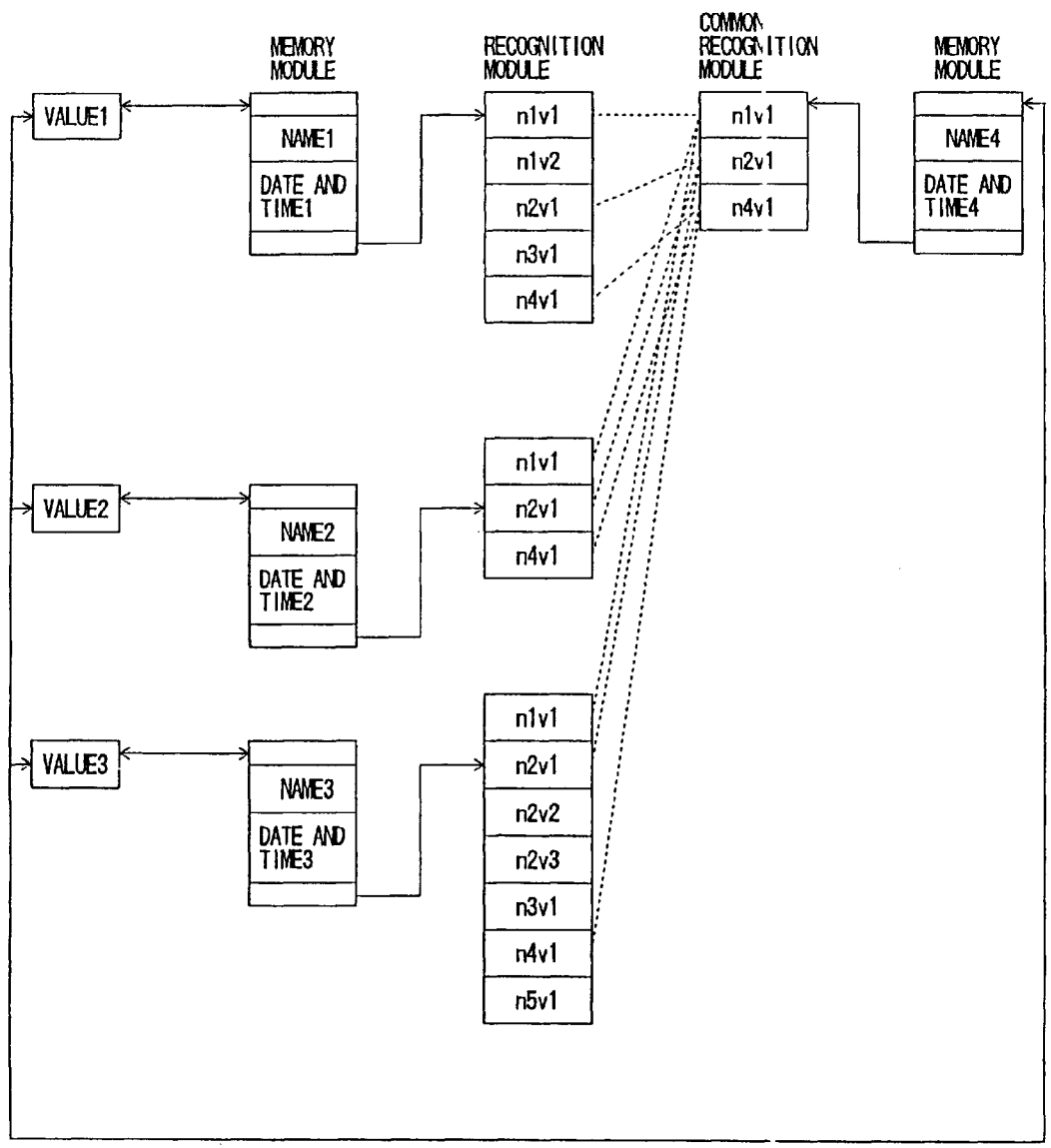
FIG. 13 is an illustrative drawing for explaining a value grouping process by a super-class generating unit of FIG. 3.

FIG. 13 is an illustrative drawing for explaining a value grouping process by the super-class generating unit 23 of FIG. 3. In the value grouping process, values bearing similar features are grouped together. By grouping the values in this manner, the values bearing similar features can be reused without explicitly conducting a search.

In order to group values bearing similar features, common recognition-module elements are extracted from a plurality of values, and a super class having these common recognition-module elements is generated. In this case, a user may newly add a common concept to the recognition module of the super class. The generated super class is then provided with the memory module. This memory module is linked to the values from which the common recognition-module elements are extracted.

Figure 14:
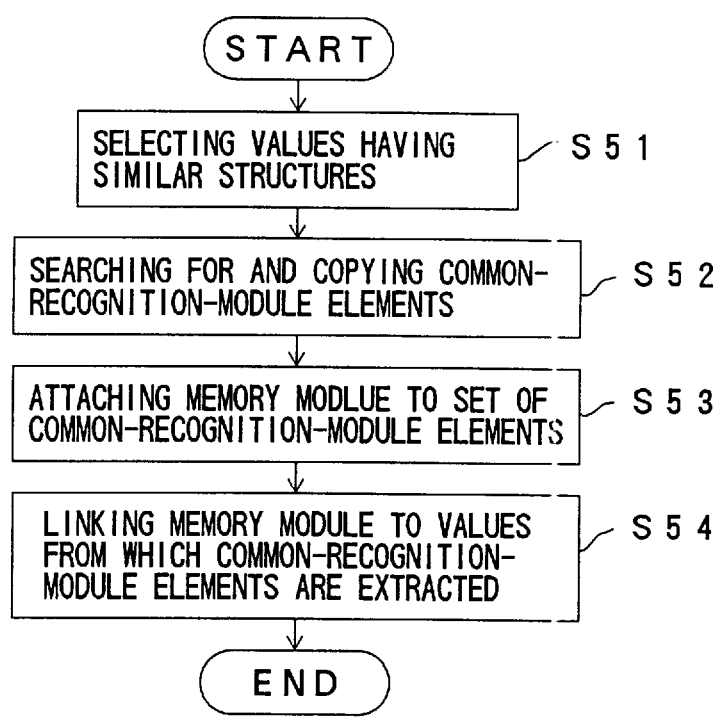
FIG. 14 is a flowchart of the value grouping process by the super-class generating unit.

FIG. 14 is a flowchart of the value grouping process by the super-class generating unit 23.

At a step S51, values having similar structures are selected. The selection of the values may be made by a user. Alternately, the data-management device may present a tentative list of values having similar structures, and, then, the user may select the values having similar structures from this list.

At a step S52, common recognition-module elements shared by all the selected values are searched for and copied from the recognition modules of the selected values. The common recognition-module elements thus copied are stored as one set.

At a step S53, a memory module is attached to the set of common recognition-module elements. A name is provided by the user.

At a step S54, the memory module is linked through pointers with the values from which the common recognition-module elements are extracted. This ends the procedure.

In the data-management device 10 according to the embodiment of the present invention, the super-class generating unit 23 carries out the value grouping process as described above, so that values bearing similar features can be categorized as lower-level concepts of a more general super class comprised of the similar features. That is, the super class represents purely the common features, and the values having the common features plus individual features are placed as the lower-level concepts under the super class. In this manner, grouping of data based on upper-level concepts and lower-level concepts is carried out through accumulation of values without determining a schema in advance.

A function of maintaining an integrity of values in the data-management device 10 according to the embodiment of the present invention will be described below.

A value having a content "120 million" and a name "POPULATION" shown in FIG. 2B is used as an example for explanation. Assuming that this value has a recognition-module element "Japan's population in 1988", the value and the description thereof will be represented as "120 million: population, Japan's population in 1988" for the sake of explanation. A user starts operating the data-management device 10, and modifies the value "120 million" to a value "121 million". In this case, the data-management device 10 of the present invention does not immediately delete the original value "120 million". Instead, the data-management device 10 keeps the original value and the description "120 million: population, Japan's population in 1988" in the data storing unit 15. For the user, it seems that the user has modified the data of the database. In reality, however, the original value in the data storing unit 15 is separated from the value in the memory manipulated by the user.

Then, the user modifies the recognition module from "Japan's population in 1988" to "Japan's population in 1993". After the modification, the user finishes operating the data-management device 10. At the end of the user operation, the data-management device 10 notifies the user that the data "120 million: population, Japan's population in 1988" is changed to the data "121 million: population, Japan's population in 1993". At this point, the user determines whether to delete the original value or to retain it, thereby sorting out relations between values having the same name.

In the present invention, a plurality of values having the same name "POPULATION" can exist. Thus, the user can given an instruction to retain the original value. In this case, the modified value, not the original value, is used in the set value of the country data shown in FIG. 2B. The original data is stored separately from the set value of the country data as a collection of the value, the memory module, and the recognition module. When values having the name "POPULATION" are searched for later on, each value can be distinguished based on the description of the recognition module.

According to the present invention, the data-management method generates set values having values as constituent elements through the accumulation of values, so that a data structure relating the values with each other need not be determined in advance.

Also, according to the present invention, a single value, a set value comprised of a plurality of single values, and a set value comprised of a plurality of set values are treated in the same manner.

Also, according to the present invention, values serving as constituent values of a set value are stored after they are sorted in a specific arrangement, so that a comparison between different set values is easily made.

Also, according to the present invention, copying of a value provides a function of manipulating values based on a defined data structure.

Also, according to the present invention, generation of a new value having the same description as an existing value provides a function of manipulating values based on an existing data structure.

Also, according to the present invention, an addition of a constituent element to a set value provides a function of manipulating values based on a defined data structure.

Also, according to the present invention, a removal of a constituent element from a set value provides a function of manipulating values based on a defined data structure.

Also, according to the present invention, a function of removing a set value is provided.

Also, according to the present invention, a description of a value is comprised of a plurality of recognition-module elements, so that each element of the description can be treated separately.

Also, according to the present invention, one or more of the plurality of recognition-module elements can be used for a search condition to conduct a search for values.

Also, according to the present invention, indexes are provided for each of the recognition-module elements, and, also, indexes for these indexes are provided, so that a search using one of the recognition-module elements as a search condition can be conducted at high speed.

Also, according to the present invention, the description of a value includes a name of the value, so that the value can be identified by using the name.

Also, according to the present invention, a value or a set value comprised of values can be searched for by using a value as a search condition.

Also, according to the present invention, indexes are generated for values having an indicated name, so that a search using a value as a search condition is carried out at high speed.

Also, according to the present invention, similar values having common data as a description thereof are grouped together under an upper-level concept formed by extracting the common data, so that grouping of data based on upper-level concepts and lower-level concepts is carried out without determining the data structure in advance.

Also, according to the present invention, values having the same name are treated separately, and are sorted out at the end of an operation, so that an integrity of the values can be maintained.

Further, the present invention is not limited to these embodiments, but various variations and modifications may be made without departing from the scope of the present invention.

What is claimed is:

1. A method of data management comprising the steps of:
   a) receiving a plurality of values in the absence of a data structure relating said values to each other, thereby allowing each of said values to exist unrelated to each other when said values are input by a user;
   b) obtaining descriptions, each of said descriptions describing a corresponding one of said values;
   c) linking each of said values with a corresponding one of said descriptions;
   d) generating pointers, each of said pointers pointing to a corresponding one of said values;
   e) organizing said pointers in an arrangement representing a set having said values as elements;
   f) obtaining a description of said set; and
   g) linking said arrangement with said description of said set,
   wherein said data structure relating said values to each other is determined by said arrangement through accumulation of said values.

2. The method as claimed in claim 1, wherein
   said step d) comprises a step of generating pointers, each of said values being pointed to by a plurality of corresponding ones of said pointers, and
   said step e) comprises a step of organizing said pointers in a plurality of arrangements, each of said arrangements representing said set in a different order of said pointers.

3. The method as claimed in claim 1, wherein each of said values is allowed to exist alone and said arrangement is allowed to be treated as one of elements of a set represented by another arrangement, so that said value, said arrangement, and said another arrangement are treated in the same manner.

4. The method as claimed in claim 3, further comprising the steps of:
   making a copy of one of said values; and
   linking said copy with one of said descriptions corresponding to said one of said values.

5. The method as claimed in claim 3, further comprising the steps of:
   creating a new value;
   linking said new value with one of said descriptions.

6. The method as claimed in claim 3, further comprising a step of adding a value as an element to said elements of said set.

7. The method as claimed in claim 2, further comprising a step of removing one of said values from said elements of said set.

8. The method as claimed in claim 3, further comprising a step of destroying said set by deleting said arrangement of said pointers.

9. The method as claimed in claim 3, wherein each of said descriptions linked to said values includes a plurality of data regarding a corresponding one of said values.

10. The method as claimed in claim 9, further comprising the steps of:

h) selecting one datum of said plurality of data;

i) setting a search condition for said one datum; and j) searching said values for values satisfying said search condition.

11. The method as claimed in claim 10, further comprising the steps of:

creating first indexes for each of said plurality of data; and creating second indexes for finding said first indexes for one datum of said plurality of data, wherein said step j) searches said values for values satisfying said search condition by using said first indexes and said second indexes.

12. The method as claimed in claim 9, wherein said plurality of data includes a name of a corresponding one of said values.

13. The method as claimed in claim 12, further comprising the steps of:

selecting some of said values similar to each other;

making a copy of at least one datum of said plurality of data, said at least one datum being shared by said some of said values;

attaching said name to said copy of said at least one datum; and linking said name with said some of said values.

14. The method as claimed in claim 3, wherein names are given to said values, each of said names being included in a corresponding one of said descriptions linked with said values.

15. The method as claimed in claim 14, further comprising the steps of:

h) indicating one of said names;

i) setting a search condition for searching said values having said one of said names;

j) searching said values for values satisfying said search condition, an arbitrary one of said values found in a search being called a found value; and k) outputting, as a search result, one of said found value, a name of a set having said found value as an element, and a value of another element of said set having said found value as said element.

16. The method as claimed in claim 15, further comprising a step of creating indexes for said values having said one of said names, wherein said step j) searches said values by using said indexes.

17. A device for data management comprising:

inputting means for receiving values and first descriptions in the absence of a data structure relating said values to each other, thereby allowing each of said values to exist unrelated to each other when said values are input by a user, each of said first descriptions describing a corresponding one of said values;

collecting means for putting some of said values together to create a set, said collecting means comprising:

first means for generating pointers, each of said pointers pointing to a corresponding one of said some of said values, and second means for organizing said pointers in an arrangement representing said set having said some of said values as elements, wherein a plurality of sets equivalent to said set are created and said sets are treated as said values;

analyzing means for generating second descriptions, each of said second descriptions describing a corresponding one of said values;

link means for linking each of said values with a corresponding one of said first descriptions and a corresponding one of said second descriptions; and storing means for storing said values including said sets, said first descriptions, and said second descriptions, wherein said data structure relating said values to each other is determined by said arrangement through accumulation of said values.

18. The device as claimed in claim 17, wherein said first means generates pointers, each of said some of said values being pointed to by a plurality of corresponding ones of said pointers, and said second means organizes said pointers in a plurality of arrangements, each of said arrangements representing said set in different order of said pointers.

19. The device as claimed in claim 17, wherein each of said values is allowed to exist alone and said arrangement is allowed to be treated as one of elements of a set represented by another arrangement.

20. The device as claimed in claim 19, further comprising means for making a copy of one of said values and for linking said copy with one of said first descriptions and one of said second descriptions corresponding to said one of said values.

21. The device as claimed in claim 19, further comprising means for creating a new value and for linking said new value with one of said first descriptions and a corresponding one of said second descriptions.

22. The device as claimed in claim 19, further comprising means for adding a value as an element to said elements of said set.

23. The device as claimed in claim 19, further comprising means for removing one of said values from said elements of said set.

24. The device as claimed in claim 19, further comprising means for destroying said set by deleting said arrangement of said pointers.

25. The device as claimed in claim 19, wherein each of said first descriptions and a corresponding one of said second descriptions comprise a plurality of data regarding a corresponding one of said values.

26. The device as claimed in claim 25, wherein said plurality of data includes a name of a corresponding one of said values.

27. The device as claimed in claim 26, further comprising super-class generating means for making a copy of at least one datum of said plurality of data shared by selected ones of said values, for attaching said name to said copy of said at least one datum, and for linking said name with said selected ones of said values.

28. The device as claimed in claim 26, wherein when said name of one of said values input by said inputting means has the same name as another one of said values stored in said storing means, said name of said one of said values and said name of said another one of said values are treated independently, and relations between said values having the same name are sorted out at an end of an operation on said values.

29. The device as claimed in claim 25, further comprising first search means for setting a search condition for a selected datum of said plurality of data and for searching said values for values satisfying said search condition.

30. The device as claimed in 29, further comprising index generating means for creating first indexes for each of said plurality of data and for creating second indexes for finding said first indexes for one datum of said plurality of data, wherein said first search means searches said values for values satisfying said search condition by using said first indexes and said second indexes.

31. The device as claimed in claim 19, wherein names are given to said values, each of said names being included in a corresponding one of said first descriptions linked with said values.

32. The device as claimed in claim 31, further comprising second search means for searching said values for values satisfying a search condition set for said values having an indicated one of said names, an arbitrary one of said values found in a search being called a found value, said second search means outputting, as a search result, one of said found value, a name of a set having said found value as an element, and a value of another element of said set having said found value as said element.

33. The device as claimed in claim 32, further comprising index search means for creating indexes for said values having said indicated one of said names, wherein said second search means searches said values by using said indexes.

* * * * *